(12) United States Patent
Franke et al.

(10) Patent No.: US 12,704,368 B2
(45) Date of Patent: Aug. 11, 2026

(54) METHOD FOR COMPENSATING FOR ANGULAR ERRORS

(71) Applicant: TDK-Micronas GmbH, Freiburg (DE)

(72) Inventors: Joerg Franke, Freiburg (DE); Johannes Gutmann, Staufen (DE)

(73) Assignee: TDK-Micronas GmbH, Freiburg (DE)

( * ) Notice: Subject to any disclaimer, the term of this patent is extended or adjusted under 35 U.S.C. 154(b) by 158 days.

(21) Appl. No.: 18/806,644

(22) Filed: Aug. 15, 2024

(65) Prior Publication Data

US 2025/0060210 A1 Feb. 20, 2025

(30) Foreign Application Priority Data

Aug. 15, 2023 (DE) .................... 10 2023 003 366.9

(51) Int. Cl.
*G01B 7/30* (2006.01)
*G01D 5/14* (2006.01)
*G01D 5/16* (2006.01)

(52) U.S. Cl.
CPC .............. *G01B 7/30* (2013.01); *G01D 5/145* (2013.01); *G01D 5/16* (2013.01)

(58) Field of Classification Search
CPC ... G01B 7/00; G01B 7/30; G01D 5/00; G01D 5/12; G01D 5/14; G01D 5/142; G01D 5/145; G01D 5/16; G01D 18/00; G01D 18/008
USPC ............................... 324/200, 207.11, 207.12
See application file for complete search history.

(56) References Cited

U.S. PATENT DOCUMENTS 10,794,752 B2 * 10/2020 Deak ....................... G01F 25/10
2011/0025309 A1 * 2/2011 Saruki ................... G01D 5/145 324/207.21
2016/0011010 A1 1/2016 Muthers

FOREIGN PATENT DOCUMENTS

DE 102014109693 A1 1/2016
DE 102020105256 A1 9/2021
DE 102021112732 A1 11/2022

* cited by examiner

*Primary Examiner* — Hoai-An D. Nguyen
(74) *Attorney, Agent, or Firm* — Muncy, Geissler, Olds & Lowe, P.C.

(57) ABSTRACT

A method for compensating angular errors when determining angular values of an arrangement with a permanent magnet and at least two magnetic field sensors. A distance is formed between the permanent magnet and the magnetic field sensors in which a sine signal and a cosine signal are generated. An evaluation signal corresponding to the angular values is formed from the two signals using an arc tangent function, wherein arrangement errors and errors of a measurement and evaluation unit change the shape of the evaluation signal and lead to an angular deviation in the evaluation signal. To minimize the angular deviation, offset values of the signals are changed and offset values are ascertained by determining a first harmonic in the evaluation signal and/or a second harmonic in the signals and/or density differences of measurement points of a Lissajous curve.

15 Claims, 4 Drawing Sheets

METHOD FOR COMPENSATING FOR ANGULAR ERRORS

This nonprovisional application claims priority under 35 U.S.C. § 119 (a) to German Patent Application No. 10 2023 003 366.9, which was filed in Germany on Aug. 15, 2023, and which is herein incorporated by reference.

BACKGROUND OF THE INVENTION

Field of the Invention

The invention relates to a method for compensating for angular errors.

Description of the Background Art

A method is known from DE 10 2014 109 693 A1, which corresponds to US 2016/0011010, which is incorporated herein by reference, and in which an angular position of a magnetic device with an axis of rotation is determined using non-contact measurement. In this case, the magnetic device has one magnet and at least three magnetic field sensors, wherein a sine and a cosine output signal is calculated from the signals of the magnetic field sensors by a transform.

From the two output signals, or from the instantaneous values of the two output signals, the angle of rotation, i.e., the angular position of the magnet or sensor arranged on the axis of rotation, is calculated directly in an evaluation device by an arc tangent function.

By using at least three magnetic field sensors, magnetic interference fields can be compensated, wherein interference fields occur especially in the field of application of automotive electronics. The device and the method are not limited to three magnetic field sensors. If more than three sensors are used, the angular position can be calculated more accurately.

However, such methods are not suitable to compensate for errors caused by positioning and positional inaccuracies. For example, both magnet and sensor devices can be axially offset from each other by tolerances or have an inclination or tilt.

Further errors in the signals and consequently in the determination of angles are caused by non-ideal magnetic properties and temperature fluctuations and aging, in particular. Basically, the errors can be divided into three classes: Offset errors, causing the signals to have DC components, and Gain errors, causing deviations in the peak values of the amplitudes of the signals, and Orthogonality errors, causing deviations in the phase shift of the two signals.

From the "Application Note APN000202_001EN", which is incorporated herein by reference and attached as an appendix to the specification, further methods for compensating for these errors are known. The underlying devices have means to carry out compensation processes.

However, due to the variety of error sources and the superposition of error sources, such as an axial misalignment between the magnet and sensor device in conjunction with a tilt of the magnet, effects occur that cannot be corrected using the compensation methods mentioned.

SUMMARY OF THE INVENTION

It is therefore an object of the invention to provide a method which further develops the state of the art.

According to an example, a method for compensating angular errors is provided.

The method is performed to determine angular values of an arrangement with a permanent magnet and at least two magnetic field sensors.

The two magnetic field sensors can be connected to a measurement and evaluation device.

There is a distance between the permanent magnet and the magnetic field sensors.

Using a forcibly guided mechanical movement, a sine signal and a cosine signal are generated in the magnetic field sensors, or the sine signal and the cosine signal are generated by a transform.

From the two signals, an evaluation signal corresponding to the angular values is formed using an arc tangent function, wherein arrangement errors and errors from the measurement and evaluation unit change the shape of the evaluation signal.

In the evaluation signal, the errors lead to angular deviation, wherein values for correcting offset errors in the signals, referred to in the following as offset values, are changed in order to minimize angular deviation.

In a single method step, the offset values are ascertained by determining a first harmonic for the evaluation signal and/or a second harmonic for the signals and/or density differences of measurement points of a Lissajous curve.

It should be noted that the measurement and evaluation unit generally does not determine the offset values but applies values for correcting the offset which have in particular already been determined during a calibration, for example. The latter tends to take place outside the measurement and evaluation unit and is generally stored.

In other words, in particular offset errors, i.e., DC components in the signals are known before the method is carried out and are taken into account by the measurement and evaluation unit, i.e., the signals are corrected for the DC components.

It should be noted that in contrast to the prior art, in which, for example, the minimum and maximum values of the signals are considered, whereby the resulting angular deviation is in some cases even increased instead of reduced, in the present invention the values for correcting offset errors are determined by a different method in order to reliably correct first-order angular deviations.

It is understood that the term "magnetic field sensors" can include, in particular, vertical Hall sensors and/or lateral Hall sensors and/or TMR and/or AMR and/or other types of magnetic field sensors. In addition, different types of magnetic field sensors can also be used in the arrangement.

It should be noted that the sine signal and the cosine signal can be derived directly as measurement signals from the two magnetic field sensors or only by a transform of the measurement signals. Especially if there are more than two magnetic field sensors, the sine signal and the cosine signal can normally only be generated by a transform.

Even with exactly two magnetic field sensors, depending on the arrangement of the two magnetic field sensors and/or when using different types of magnetic field sensors—for example, one of the two magnetic field sensors may be designed as a TMR and the other as a Hall sensor-a transform may be necessary.

It should be noted that according to the method, the second harmonic can be minimized in the signals by changing offset values.

The second harmonic can be determined directly in the signals or in the resulting effects, such as the resulting angular deviation of the evaluation signals or the density differences in the Lissajous curve of the two signals.

The angular deviation of the evaluation signals may be minimized, which occurs there as the first harmonic. In other words, the first harmonic is minimized.

The density differences of the measurement points can be compensated for in the evaluation using the Lissajous curve.

It should be noted that the approaches described above for a reduction of errors are equivalent to each other in terms of effect.

Error values in the signals can be determined and compared directly and only then the offset values are determined using the method according to the invention.

An advantage of the method is that errors from the axial misalignment between the magnet and sensor device or the tilting of the magnet and other causes of errors that cause higher-order effects in the signals can be compensated.

In particular, a second harmonic can be determined in the sine and cosine signals, which occurs as the first harmonic of the rotation angle value and the resulting deviation of the angle of rotation. It goes without saying that it is advantageous to examine at least a 360° run.

Furthermore, it should be noted that the method significantly expands the compensation for angular errors, which occur as second harmonics of the signals.

This increases the achievable precision of the angular measurement on the one hand, on the other hand, requirements for manufacturing tolerances and the yield or effort involved in assembling the device can be reduced. In other words, costs in production can be reduced.

It is understood that the method is not limited to rotation angle measurement. The method can be used for all forms of non-contact displacement measurement, in which at least one permanent magnet in conjunction with at least two magnetic field sensors generates a sine and cosine signal. This includes any kind of linear motion of which the magnetic structure is designed in an appropriate manner.

In an example, after calculating the angular values using the arc tangent function, the offset values can be determined from the amplitude and phase of the sine proportion, i.e., the first harmonic of the resulting angular deviation of a 360° revolution.

In an example, in order to determine the offset values from the density differences of the measurement points of the Lissajous curve, the measurement points can be recorded at a constant period velocity/frequency or rotation speed with a fixed sampling rate.

The offset values can be determined from the proportion of the first harmonic calculated using DFT or FFT in the resulting course of the error of the angle of rotation of a 360° revolution.

In a further development, the offset values can be determined from the change in correction values already generated by other methods in conjunction with the second harmonic, calculated using DFT or FFT, of the sine and cosine signals.

In other words, by means of the method according to the invention, after correction from the determination of the first harmonic, the offset errors in the signals are calculated from the determination of the second harmonic.

In a further development, the DFT calculation can be carried out using a Goertzel algorithm or, in an alternative, the first harmonic or the second harmonic is determined directly using sine adaptation, also known as sine fitting. In other words, in the alternative, exactly no FFT or DFT calculation is performed. One advantage is that the computing power required to carry out the method is reduced.

In an example, it is preferable that the offset values are determined several times, in an iterative manner. This can further increase the accuracy of the angle calculation.

In a further development, the magnetic field sensors can be spaced along an X direction.

In another further development, the magnetic field sensors can be arranged directly next to each other in the X direction and/or are partially or completely arranged on top of each other in a Z direction.

Three magnetic field sensors can each be arranged in the shape of a pixel cell, wherein three different directions of a magnetic field are measured by the three magnetic field sensors. In a further development, a number of magnetic field sensors are arranged on an X-Y plane, preferably linearly or on a circle.

After determining the correction values, a second harmonic can be determined directly in the signals from a comparison of the course of the signals with an ideal sine wave and from a comparison of the course of the signals with an ideal cosine curve.

From the correction values already determined and the deviation from the ideal curves, the offset values are determined.

The method can be used to determine the rotary angle position in an arrangement including permanent magnets and magnet field sensors.

In this case, the arrangement can have an axis with a front end and at least one permanent magnet arranged at the front end or on the side of the axis.

Magnetic field sensors can be arranged along an imaginary extension of the axis. As an alternative, magnetic field sensors arranged laterally, i.e., at a distance from the imaginary extension of the axis.

It is understood that there may be a distance between the axis and the magnetic field sensors.

A measurement and evaluation device can be connected to the magnetic field sensors, wherein when the axis is rotated, a sine signal or a cosine signal is present at an output of the respective magnetic field sensor or is obtained by a transform.

In a further development, the magnetic field sensors can be spaced along an X direction or are arranged directly next to each other in the X direction and/or are in part or completely arranged on top of each other in a Z direction. As far as the magnetic field sensors are arranged next to or on top of each other, the two magnetic field sensors measure different directions of the magnetic field.

The measurement and evaluation device can be set up to calculate an evaluation signal corresponding to the rotation angle values from the signals using an arc tangent function.

Furthermore, the measurement and evaluation device can be set up to calculate offset values for a change in the evaluation signal in order to minimize the angular deviation.

The method can be used in a different arrangement for the determination of angular values of a translational motion path.

In this case, the other arrangement comprises a large number of permanent magnet pairs arranged along the translational path and at least two magnetic field sensors arranged along the translational motion path.

The magnetic field sensors can be spaced apart from the permanent magnet pairs and arranged so as to be movable along the translational motion path.

Furthermore, a measurement and evaluation device connected to the magnetic field sensors can be provided.

In a translational movement of the permanent magnet pairs or the magnetic field sensors along the path, a sine signal or a cosine signal is present at an output of the respective magnetic field sensor or the two signals can be produced by a transform.

The measurement and evaluation device can be set up to calculate an evaluation signal from the signals which corresponds to the angular values using an arc tangent function.

Furthermore, the measurement and evaluation device can be set up to calculate offset values for a change in the evaluation signal in order to minimize the angular deviation.

The measurement and evaluation device can be set up to determine offset values using a DFT or FFT evaluation.

The measurement and evaluation device can include a Goertzel filter or the measurement and evaluation device is set up to perform sine fitting.

The measurement and evaluation device can be set up to determine the density differences of the measurement points of a Lissajous curve.

The measurement and evaluation device with the magnetic field sensors can be integrated into an IC housing, monolithically or as a multi-chip solution.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

It should be noted that in the following figures, the depicted sine and cosine signals from the two magnetic field sensors S1 and S2 are either directly available as measurement signals or only after a transform.

Figure 1:
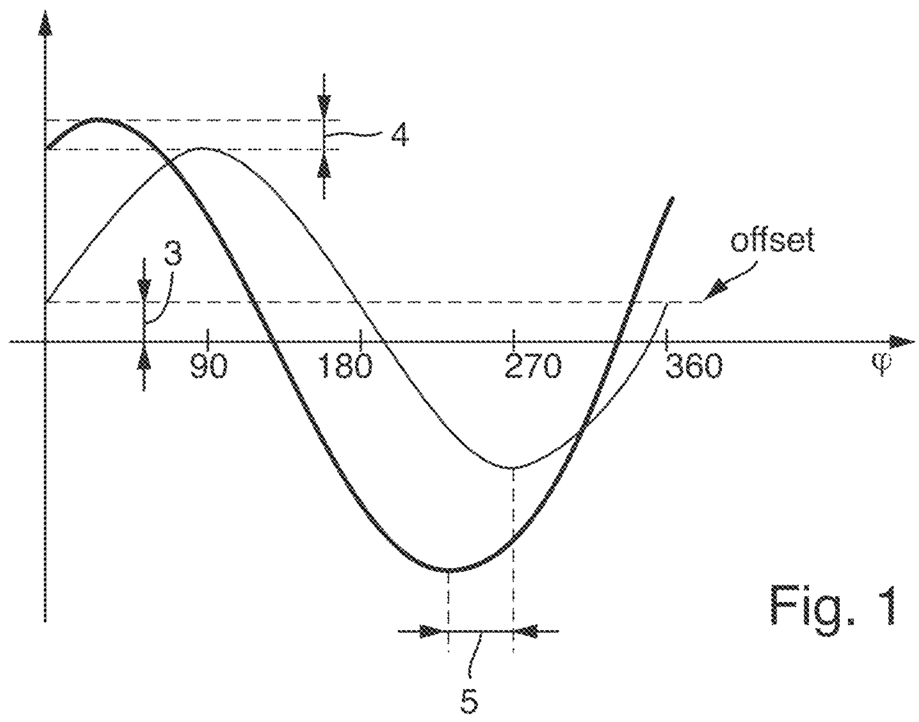
FIG. 1 shows flawed sine signals and cosine signals.

FIG. 1 shows a view of the uncompensated sine and cosine signals as a function of the rotation angle value.

The signals have three types of errors. A DC component 3, often referred to as an offset, causes a modulation of one or both measuring signals in the positive or negative direction.

A gain error 4 results in a difference in the peak values of the two measuring signals without DC component.

An orthogonality error 5 leads to a phase shift unequal to 90° in the signals. Here, the orthogonality error describes the deviation of the two measured magnetic field vector components from an ideal 90° orientation.

Figure 2:
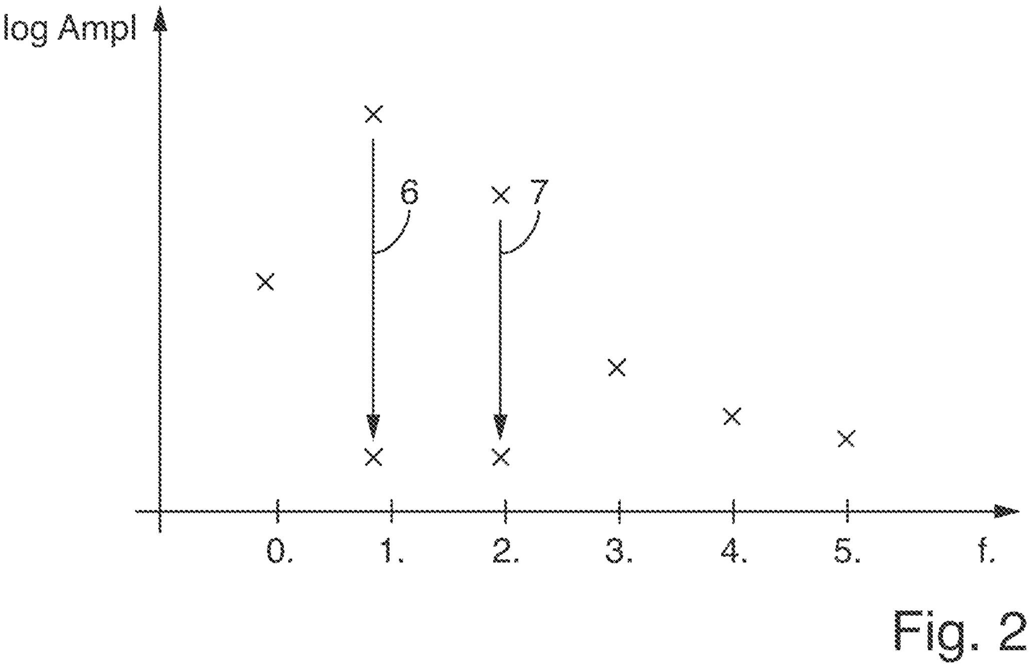
FIG. 2 shows a spectrum of the signals or the evaluation signal.

The illustration in FIG. 2 shows the spectrum of the signals. In a spectrum of the angular deviation of the evaluation signal, the deviation would occur as a first harmonic 6. By carrying out an inventive compensation, the resulting error is reduced.

The illustration also shows the depicted spectrums of the measuring signals. Measuring signals in which the DC component 3, the gain error 4 and the orthogonality error 6 have already been resolved, it is still possible for a second harmonic, often also called the first harmonic, to occur.

The first harmonic generates a difference to the fundamental frequency, which forms the actual signal and is often called the fundamental wave.

In the arc tangent calculation, the deviation ensures an error delta Phi in the resulting angle of rotation Phi.

The use of the method of the invention changes the offset values and hereby minimizes angular errors Delta Phi which are caused by the second harmonic present in the signals.

In this case, the 0-th harmonic corresponds to the DC component. The inventive method is characterized in that the offset values of the two measurement signals are changed.

It is intrinsic to the method that in the case of a second harmonic in the measurement signals, a different offset leads to a smaller resulting angular error than one in the known correction in which an offset in the signals is immediately resolved.

This can be referred to as overcompensation. In other words, using the method of the invention, the overcompensation of the error from the second harmonic in the signals leads to an increase in the accuracy of the angular calculation.

Figure 3:
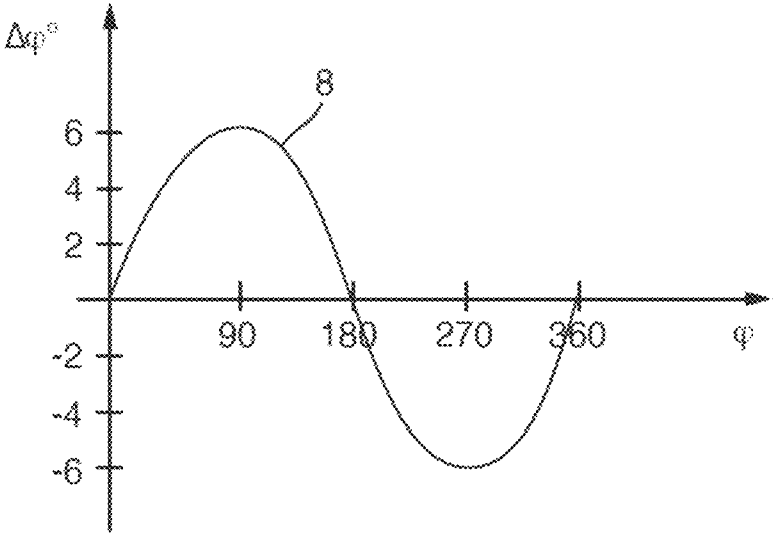
FIG. 3 shows a representation of the resulting angular error of the evaluation signal.

FIG. 3 shows a typical curve of the resulting angular error Delta Phi of the evaluation signal.

In this case, the error occurs as a first harmonic oscillation. In the described characteristics, is a deviation of the measurement signals can be seen in the form of a pronounced second harmonic. It should be noted that an offset also leads to the displayed characteristics.

Figure 4:
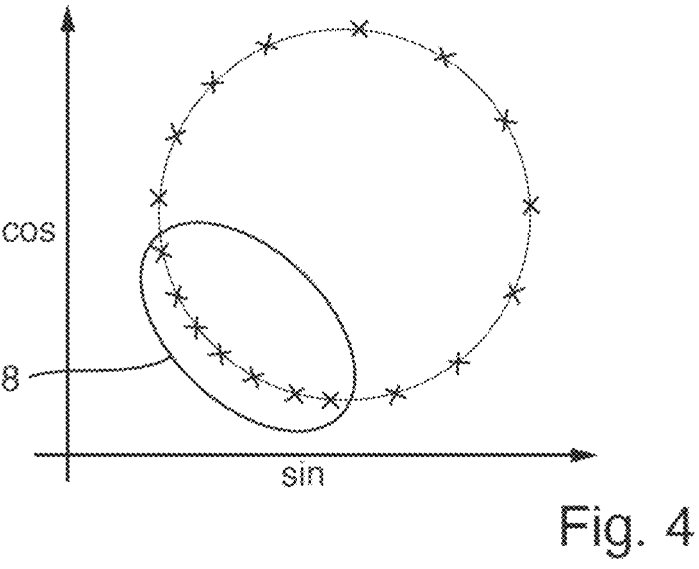
FIG. 4 shows a representation of a Lissajous curve of flawed sine and cosine signals in the form of density differences of the measurement points.

FIG. 4 shows a Lissajous curve of the sine and cosine measurement signals.

The curve is not further deformed, which means that the three errors in question are already ideally resolved. However, the curve does not have equidistant measurement points 8.

The density distribution is an indication of the occurrence of a second harmonic in the measurement signals. Changing the offset would displace the curve but homogenize the density distribution and reduce the resulting angular error Delta Phi.

Figure 5:
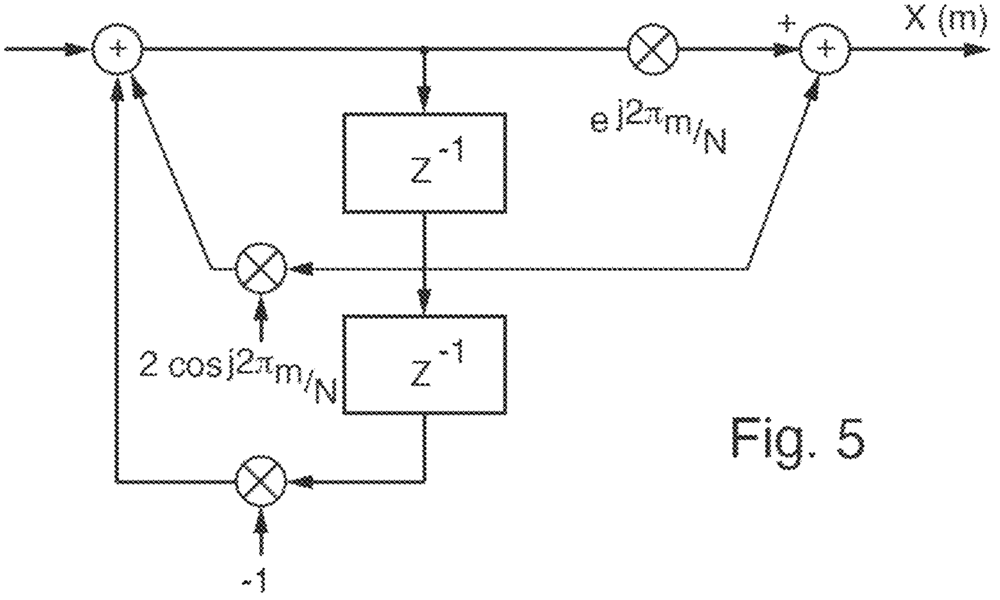
FIG. 5 shows a Goertzel filter.

In the illustration of FIG. 5, a second-order Goertzel filter is shown as an example. The use of the Goertzel filter allows for the targeted determination of individual spectral components of a signal. The Goertzel filter is particularly suitable for the determination of the second harmonic of the signals according to the invention.

Figure 6:
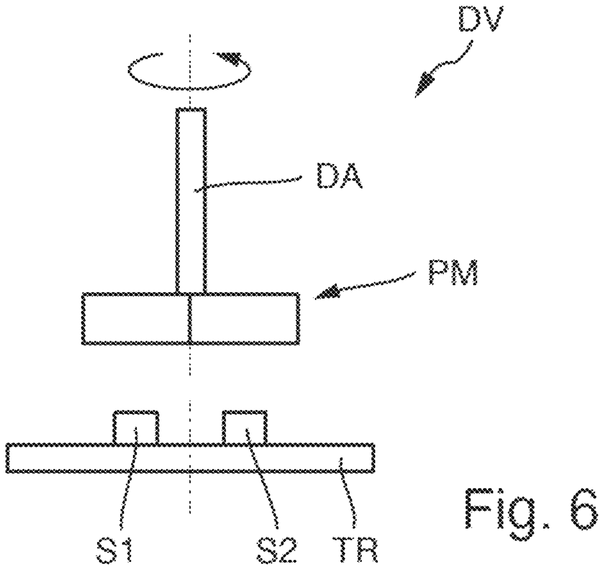
FIG. 6 shows a rotary device.

FIG. 6 shows a rotary device DV, wherein the rotary device DV has an axis of rotation DA formed in a Z direction and a permanent magnet PM arranged at a front end of the axis of rotation DA on an X-Y plane. The permanent magnet PM has a north pole N and a south pole S. Along an imaginary extension of the axis of rotation DA, a first magnetic field sensor S1 and a second magnetic field sensor S2 are arranged on a carrier board TR.

The two magnetic field sensors S1, S2 are spaced apart in an X direction by a distance x1. Both magnetic field sensors S1, S2 are also spaced from the head end of the axis of rotation DA. In the event the carrier board with the two magnetic field sensors S1, S2 tilts in relation to the front end and or the magnetic field sensors S1, S2 are misaligned, the signals are subjected to different errors.

In an example, the distance x1 between the two magnetic field sensors S1 and S2 is zero or very small, so that the two magnetic field sensors S1 and S2 are arranged on top of each other in the Z direction, wherein the two magnetic field sensors preferably measure different components of the magnetic field when arranged on top of each other.

Figure 7:
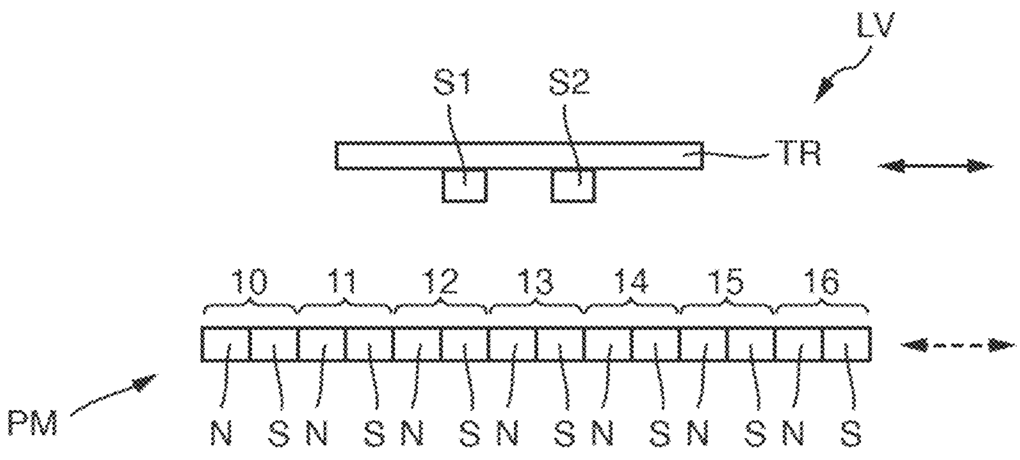
FIG. 7 shows a linear device.

FIG. 7 shows an arrangement of pairs of a permanent magnet along a straight line.

Using the linearly movable permanent magnet PM, which has the pole pairs 10-16 lined up next to each other, in each case a sine and a cosine signal can be generated by the spaced magnetic field sensors S1, S2. The linear motion also enables the inventive compensation for angular errors due to second-order deviations in the measurement signals, which can also be applied to translational displacement/position measurement.

Figure 8:
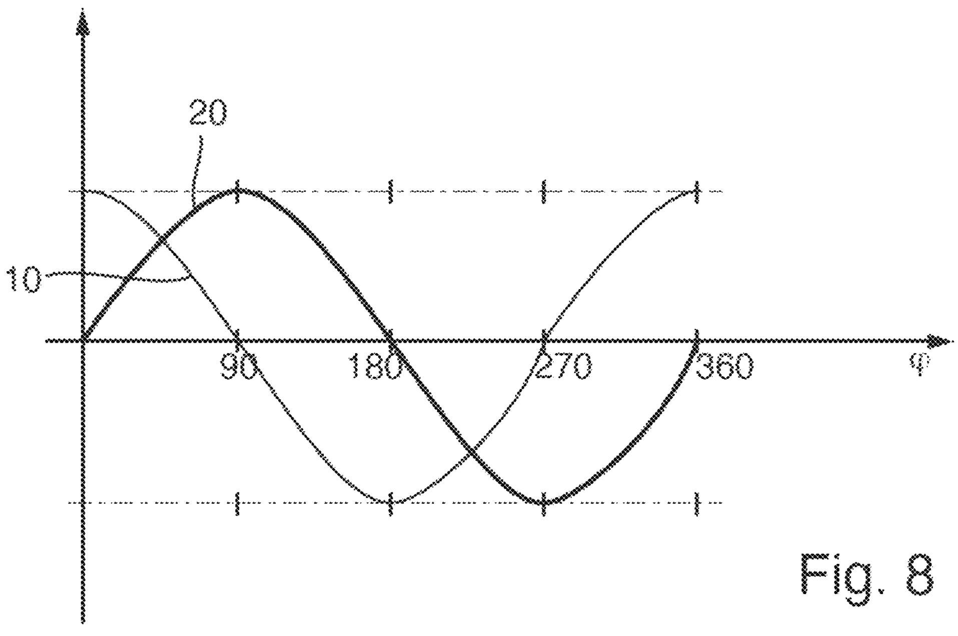
FIG. 8 shows a representation of ideal sine and cosine signals.

FIG. 8 shows an ideal progression of the two signals with a sine signal 20 and a cosine signal 10.

Both the sine signal and the cosine signal are ideal, i.e., free of errors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for compensating angular errors when determining angular values of an arrangement with a permanent magnet and at least two magnetic field sensors, the method comprising:

- connecting a measurement and evaluation device to the magnetic field sensors;
- forming a distance between the permanent magnet and the magnetic field sensors;
- generating a sine signal and a cosine signal using a forcibly guided mechanical movement in the magnetic field sensors or the sine signal and the cosine signal generated by a transform; and
- generating an evaluation signal corresponding to the angular values formed from the two signals using an arc tangent function;
- changing, based on arrangement errors and errors of the measurement and evaluation unit, a shape of the evaluation signal and lead to an angular deviation in the evaluation signal; and
- changing offset values of the measurement signals to minimize angular deviation;
- ascertaining offset values by determining a first harmonic for the evaluation signal and/or a second harmonic for the signals and/or density differences of measurement points of a Lissajous curve.

2. The method according to claim 1, wherein after calculating the angular values using the arc tangent function, the offset values are determined from the amplitude and phase of the first harmonic of the resulting angular deviation of a 360° revolution.

3. The method according to claim 1, wherein for the purpose of determining the offset values from the density differences of the measurement points of the Lissajous curve, the measurement points are recorded at a constant rotational speed with a fixed sampling rate.

4. The method according to claim 1, wherein the offset values are determined from the proportion of the first harmonic calculated using DFT or FFT from the course of the error of the angle of rotation of a 360° revolution.

5. The method according to claim 1, wherein offset values are determined by changing correction values already generated by other methods and the second harmonic of the sine and cosine signals calculated using DFT or FFT.

6. The method according to claim 4, wherein the DFT calculation is performed using a Goertzel algorithm or that the first harmonic or the second harmonic is directly determined by sine fitting.

7. The method according to claim 1, wherein a determination of offset values is carried out several times, in an iterative manner.

8. The method according to claim 1, wherein, after having determined the correction values, a second harmonic is determined directly in the signals from a comparison of the course of the signals with an ideal sine wave and from a comparison of the course of the signals with an ideal cosine curve, and from the correction values already determined and the deviation from the ideal curves, the offset values to be set are determined.

9. The method according to claim 1, wherein the magnetic field sensors are spaced along an X direction or the magnetic field sensors are arranged on top of each other in a Z direction.

10. The method according to claim 1, wherein for the determination of rotation angle values, the method further comprises:

- arranging at least one permanent magnet at a front end or on a side of an axis;
- arranging the at least two magnetic field sensors along an imaginary extension of the axis or magnetic field sensors arranged laterally to the axis, with a distance between the axis and the magnetic field sensors;
- connecting a measurement and evaluation device to the magnetic field sensors; and
- calculating via the measurement and evaluation device, when the axis is rotated, a sine signal or a cosine signal present at an output of the respective magnetic field sensor, an evaluation signal corresponding to rotation angle values from the signals using an arc tangent function in order to minimize the angular deviation.

11. The method according to claim 1, wherein, for the determination of angular values of a translational motion path, the method further comprises:

- arranging a large number of permanent magnet pairs along the translational path;
- arranging the at least two magnetic field sensors along the translational path of motion, which are spaced from the permanent magnet pairs and arranged movably along the translational path of motion;
- connecting a measurement and evaluation device to the magnetic field sensors; and
- calculating an evaluation signal via the measurement and evaluation device, during a translational movement of the permanent magnet pairs or the magnetic field sensors along the path, a sine signal or a cosine signal is present at an output of the magnetic field sensors, the evaluation signal corresponding to the angular values from the signals using an arc tangent function in order to minimize the angular deviation.

12. The method according to claim 10, wherein the measurement and evaluation device is set up to determine offset values using a DFT or FFT evaluation.

13. The method according to claim 10, wherein the measurement and evaluation device comprises a Goertzel filter or the measurement and evaluation device is set up to perform sine fitting.

14. The method according to claim 10, wherein the measurement and evaluation device is set up to determine density differences of the measurement points of a Lissajous curve.

15. The method according to claim 1, wherein the measurement and evaluation device with the magnetic field sensors is integrated into an IC housing, monolithically or as a multi-chip solution.

* * * * *